(12) United States Patent
Porten et al.

(10) Patent No.: US 8,561,394 B2
(45) Date of Patent: Oct. 22, 2013

(54) PROCEDURE AND CONTROL UNIT FOR AN ACCELERATED HEATING OF A CATALYST IN AN EXHAUST GAS SYSTEM OF A SUPERCHARGED COMBUSTION ENGINE WITH A VARIABLE VALVE CONTROL

(75) Inventors: Guido Porten, Vaihingen/Enz (DE); Juergen Raimann, Weil der Stadt (DE)

(73) Assignee: Robert Bosch GmbH, Stuttgart (DE)

(*) Notice: Subject to any disclaimer, the term of this patent is extended or adjusted under 35 U.S.C. 154(b) by 551 days.

(21) Appl. No.: 12/272,428

(22) Filed: Nov. 17, 2008

(65) Prior Publication Data

US 2009/0133391 A1    May 28, 2009

(30) Foreign Application Priority Data

Nov. 22, 2007   (DE) .................... 10 2007 056 216

(51) Int. Cl.
*F01N 3/10*   (2006.01)
(52) U.S. Cl.
USPC .................. 60/303; 30/286; 30/287; 30/307; 30/280
(58) Field of Classification Search
USPC ........................................... 60/280, 284, 285
See application file for complete search history.

(56) References Cited

U.S. PATENT DOCUMENTS

| | | | | |
|---|---|---|---|---|
| 4,235,076 A | * | 11/1980 | Meloche et al. ................ 60/602 |
| 2002/0134081 A1 | * | 9/2002 | Shiraishi et al. ................ 60/602 |
| 2003/0074890 A1 | * | 4/2003 | Yamashita et al. ............. 60/284 |
| 2003/0140618 A1 | * | 7/2003 | Schenk et al. .................. 60/284 |
| 2003/0182931 A1 | * | 10/2003 | Sonoda et al. .................. 60/284 |
| 2005/0000217 A1 | * | 1/2005 | Nau et al. ........................ 60/612 |
| 2005/0097888 A1 | * | 5/2005 | Miyashita ....................... 60/602 |
| 2008/0035127 A1 | * | 2/2008 | Elsasser et al. ............ 123/568.21 |

FOREIGN PATENT DOCUMENTS

| | | |
|---|---|---|
| DE | 100 62 377 | 6/2002 |
| DE | 100 63 750 | 6/2002 |
| JP | 2005-282478 | 10/2005 |
| JP | 2005-299504 | 10/2005 |
| JP | 2006-329144 | 12/2006 |

OTHER PUBLICATIONS

Pocket Book on Motor Vehicle Technology, 25th edition, ISBN 3-528-23873-3, Robert Bosch GmbH, 2003, p. 474-475.

* cited by examiner

*Primary Examiner* — Thomas Denion
*Assistant Examiner* — Patrick Maines
(74) *Attorney, Agent, or Firm* — Merchant & Gould P.C.

(57) ABSTRACT

Suggested is a procedure for heating a catalyst in the exhaust gas system of a supercharged combustion engine with direct fuel injection and variable gas exchange valve control by producing a reactive exhaust gas fuel/air mixture in the exhaust gas system, whereby an air percentage of the reactive fuel/air mixture is thereby produced that air is rinsed from a suction system of the combustion engine over its combustion chambers into the exhaust gas system. The invention distinguishes itself thereby that the combustion engine is operated in idle mode after a cold start with a greater valve overlap and/or a greater valve overlap profile than in a normal operation where the catalyst is already heated as well as with an apportionment of a fuel amount that has to be injected before a combustion into at least two partial injections per ignition and combustion chamber and with a suboptimal ignition angle efficiency.

2 Claims, 4 Drawing Sheets

PROCEDURE AND CONTROL UNIT FOR AN ACCELERATED HEATING OF A CATALYST IN AN EXHAUST GAS SYSTEM OF A SUPERCHARGED COMBUSTION ENGINE WITH A VARIABLE VALVE CONTROL

TECHNICAL FIELD

The invention concerns a procedure for heating a catalyst in the exhaust gas system of a supercharged combustion engine with a direct fuel injection and variable gas exchange valve control by producing a reactive exhaust gas fuel/air mixture in the exhaust gas system, whereby an air percentage of the reactive fuel/air mixture is thereby produced that air is rinsed from a suction system of the combustion engine over its combustion chambers into the exhaust gas system. The invention furthermore concerns a control unit, which is customized to implement the procedure. Thereby the implementation means a control of the course of the procedure.

BACKGROUND

Such a procedure and such a control unit are already known from DE 100 63 750 A1. In this script one of several cylinders is used for pumping air out of the suction system into the exhaust gas system while fuel supply is disabled. The amount of the pumped air is controlled by interventions in a variable valve control of this cylinder. The turbo charger can be waived at the known subject and is therefore not significant for the pumping of air. Variable valve controls are furthermore known for example from the pocket book on motor vehicle technology, $25^{th}$ edition, ISBN 3-528-23873-3, Robert Bosch GmbH, 2003, p. 474 and 475.

The heating of a catalyst by producing a reactive exhaust gas fuel/air mixture in the exhaust gas system is also already known from the publication of DE 100 63 750 A1 as injecting secondary air in a rich exhaust gas atmosphere. The secondary air is usually injected behind the outlet valves of the combustion engine and reacts there exothermically with a rich exhaust gas atmosphere, which results from combustions of combustion chamber fillings of the combustion engine. For injecting secondary air usually a separate secondary air pump is used, which is electronically driven.

The subject known from DE 100 63 750 A1 temporarily uses a cylinder of the combustion engine as a secondary air pump, so that a separate secondary air pump that is driven electrically or mechanically can be waived. But then the concerned cylinder is not available for a torque generation, which causes an increased uneven running.

It is for example known to produce a maximum heat quantity in the exhaust gas during an after-start phase of the combustion engine, without changing the power that has been raised in idle mode and the idle toque of ca. 1.200 min-1 that has been increased in the after-start phase. This is achieved at a combustion engine with a direct fuel injection thereby that a first percentage of the fuel amount is injected into the suction stroke and a second percentage of the fuel amount into the compression stroke. This results in a layered fuel apportionment in the combustion chamber with a zone of comparably rich and therefore well ignitable fuel/air mixture around the ignition plug that results from the injection of the second percentage. This operation of the combustion engine is also called homogeneous split mode, whereby split refers to the apportionment of the injection.

A charging concept with an exhaust gas turbo charger is known from DE 100 62 377 A1, whereby its shaft is driven by an electromotor. This drive shall reduce the so-called 'turbo lag' at operating point changes. The turbo lag originates as it is well known thereby that the turbine has to be initially accelerated at a sudden torque demand from an operating point with a low exhaust gas mass flow, in order to produce the required boost pressure on the compressor side. The supporting electronic drive reduces the resulting delay.

This charging concept, which has basically nothing to do with a catalyst heating procedure, is used in DE 100 62 377 A1, in order to replace the separate secondary air pump. Thereby the turbo charger is electronically driven when the catalyst has to be heated. Thereby it already produces a certain boost pressure even in operating points with low exhaust gas enthalpy, which is sufficient to let air flow out of the suction system over a pipe connection past the combustion chambers of the combustion engine into the exhaust gas system. Thereby a separate secondary air pump can be waived at turbo chargers that are supported by an electrical drive. But the secondary air injection requires even at these charging concepts an electric drive.

SUMMARY

With this background the task of the invention is to provide a procedure and a control unit, which allows a heating of a catalyst in the exhaust gas of a combustion engine that is charged with an exhaust gas turbo charger, but which works in the concerned cylinder without a separate secondary air pump, without an electrical drive of the turbo charger or a compressor that is arranged in the suction pipe and without an alienated usage of individual cylinders as a secondary pump when the ignition or the fuel supply is disabled.

This task is solved each time with the features of the independent claims.

As a result of the combustion engine being operated at a procedure of the above mentioned type in idle mode after a cold start with a greater valve overlap and/or a greater valve overlap profile than in a normal operation, unburnt air flows from the suction system over the participating combustion chamber into the exhaust gas system when there is a sufficient pressure drop between the suction system and the exhaust gas system. But the pressure drop is not sufficient under normal circumstances or even has a negative sign, so that exhaust gas flows back into the combustion chamber or is only incompletely ejected. This is also known as internal exhaust gas recirculation.

The invention creates the pressure drop, which is necessary for an air overflow that takes place through the combustion chamber, from a comparably high pressure in the suction system to a comparably low pressure in the exhaust gas system by a significant increase of the exhaust gas enthalpy, which results in an increased energy transfer on the turbine of the turbo charger and therefore in a quick increase and sufficient high boost pressure level of the combustion engine in idle mode. Thereby a normal operation means an operation, in which no secondary air supply should be created, which is the case for example at a combustion engine at operating temperature and sufficiently heated exhaust gas systems.

The operation of the combustion engine with a direct injection of fuel into its combustion chambers and with an apportionment that takes place after a cold start of a fuel amount, which has to injected before the beginning of a combustion, into at least two partial injections per ignition and combustion engine, creates very stabile combustions, which allow very late ignition angles. At combustion procedures that are air- and wall-formed late ignition angles up to ca. 25 degrees after OT can be adjusted and at jet-formed combustion procedures even later ignition angles up to ca. 30-35 degrees crankshaft angle after OT at a stabile torque behavior and controllable raw emissions can be adjusted.

The ignition angle efficiency, which means the quotient of the torque at a delayed ignition angle in the numerator and the torque at an ignition angle that is optimal for a maximum torque development, decreases more and more with an increasing late time displacement of the ignition.

The efficiency loss causes an increased exhaust gas temperature and therefore an increased exhaust gas enthalpy due to thermodynamic regularities. Furthermore the combustion engine has to be operated at a delayed ignition with increased combustion chamber fillings, in order to compensate the torque loss that comes along with the efficiency decline. The given ignition angle values result from increasing the combustion chamber fillings up to values of over 75% of the maximum filling that is possible under normal circumstances. An operation with such values of the combustion chamber filling means here also an almost de-throttled operation.

This causes an increased exhaust gas mass flow, which also increases the exhaust gas enthalpy. With an increasing exhaust gas enthalpy the driver input that is transferred to the turbine of the exhaust gas turbo charger increases. Altogether this results therefore in a comparably high exhaust gas amount, whose temperature is comparably high due to the bad ignition angle efficiency, so that a maximum heat flow (enthalpy current) adjusts in the exhaust gas system.

The resulting increase of the exhaust gas enthalpy alone already causes an accelerated heating of the exhaust gas system. Furthermore it causes that the turbo charger without a supporting electrical driver establishes within a few seconds after a cold start a comparably high boost pressure and therefore a pressure drop or a scavenging loss to the exhaust gas. It turned out, that this scavenging loss is already sufficient big also at a low engine speed in the range of the idle engine speed of the combustion engine, in order to let air flow from the suction system over the combustion chamber into the exhaust gas system during a valve overlap or a valve overlap profile that has been purposefully increased at a load alternation-ot and therefore simultaneously opened inlet valve and outlet valve.

Therefore a separate secondary air pump can be waived even at one-staged charging concepts, which work without an electrically supported turbo charger and without an additional compressor (for example root-injector, compressor) that is electrically or mechanically driven by the combustion engine. Therefore the invention uses the basically known homogeneous split mode at a supercharged combustion engine for a boost pressure increase, in order to create a sufficient scavenging loss (pressure drop) for a secondary air injection between the suction system and the exhaust gas system. The invention furthermore uses the chance that arises from a variable valve control to control the amount of secondary air that flows over the participating combustion chambers.

Thereby all cylinders can be participating regularly at the secondary air overflow, whereby unbalances at the operation of individual cylinders among each other can be avoided. As a desired result a negative influence on the running smoothness of the combustion engine is avoided. A further advantage is that the valve overlap and/or the valve overlap profile can be adjusted equally for all cylinders, for example by twisting the cam shaft. A more expensive, cylinder-individual controlling of the gas exchange valves is therefore not necessary.

Further advantages of the invention accrue form the dependent claims, the description and the attached figures.

It shall be understood that the previously mentioned and the following features that still have to be explainer further can not only be used in the given combination, but also in other combinations or alone, without leaving the scope of the present invention.

BRIEF DESCRIPTION OF THE DRAWINGS

Embodiments of the invention are illustrated in the drawings and further explained in the following description. It is schematically shown in.

DETAILED DESCRIPTION

Figure 1:
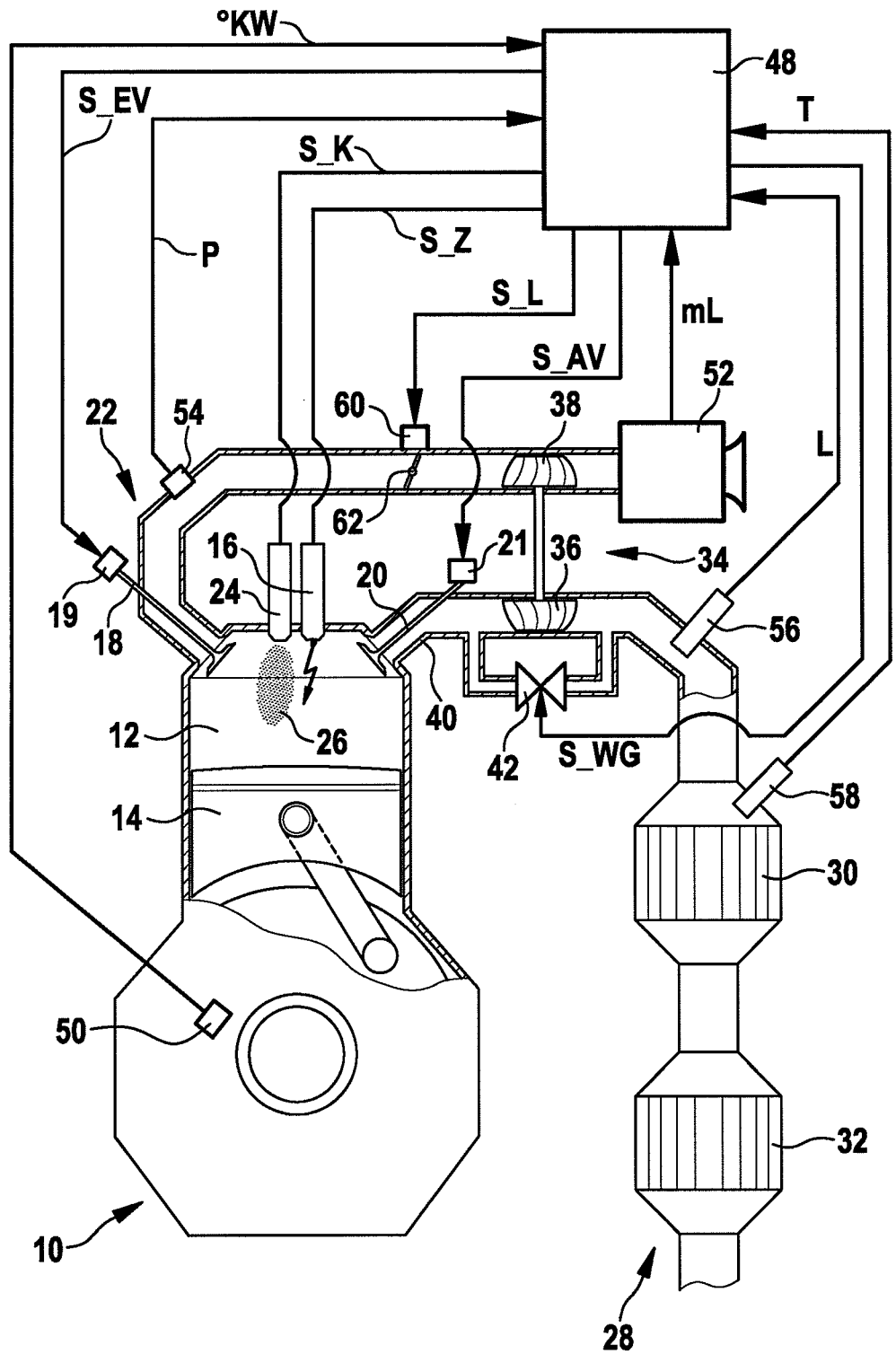
FIG. 1 is a combustion engine that works with direct gasoline injection and variable gas exchange valve control and a control unit.

In particular FIG. 1 shows a combustion engine 10 with at least one combustion chamber 12, which is flexibly sealed up by a piston 14. Fillings of the combustion chamber 12 with mixture of fuel and air are ignited by an ignition plug 16 and subsequently burnt. In a preferred embodiment the combustion engine 10 is optimized for a jet-formed combustion procedure. A combustion procedure means the way of the mixture establishment and the energy conversion in the combustion chamber 12. The jet-formed combustion procedure distinguishes itself thereby that fuel is injected right around the ignition plug and evaporates there. This requires an exact positioning of the ignition plug 16 and fuel-injector and a precise jet-direction, in order to be able to ignite the mixture at the right time.

An exchange of the filling of the combustion chamber 12 is controlled with inlet valves 18 and outlet valves 20, which are opened and closed phase-synchronically to the movement of the piston 14. The actuation of the gas exchange valves 18 and 20 takes place over actuators 19 and 21, whereby an actuator 19 always actuates one or several inlet valves 18 and whereby actuator 21 always actuates one or several outlet valves 20.

The actuators 19, 21 are preferably realized as electro-mechanical, electromagnetic, electro-hydraulic, electro-pneumatic actuators or a combination of such actuators. Familiar cam shafts for example are such, whose phase position that is relative to a crank shaft is influenced by an actuator that is actuated with oil pressure and electrically controlled. Changing the phase position, which causes an earlier opening of the inlet valves (and/or a later closing of the outlet valves), also results in an increase of the valve overlap.

As it is well known the valve overlap thereby means the angle range of a rotary movement of the crank shaft (or cam shaft) of the combustion engine 10, in which at least one inlet valve and at least one outlet valve of a cylinder are opened together. Also known are variable valve controls, at which the valve stroke can be switched or continuously changed alternatively or additionally to a change of the phase position of at least one cam shaft, which influences the valve overlap profile among others. The valve overlap profile means here the effective opening profile between the suction system and the exhaust gas system. When both the inlet valve and the outlet valve of a cylinder are opened simultaneously this is the smaller opening profile of the mutually opened valves 18, 20.

Besides the different possibilities for a variable actuation of the gas exchange valves 18 and 20 are known to the expert for example from the previously mentioned pocket book on motor vehicle technology and are not illustrated in detail in FIG. 1 due to clarity.

At an opened inlet valve 18 and a downstream moving piston 14, thus in the suction stroke, air flows from a suction system 22 into the combustion chamber 12. Fuel 26 is dosed to the air in the combustion chamber 12 over an injector 24. At an opened outlet valve 20 exhaust gas that results from a combustion of the combustion chamber fillings is ejected into an exhaust gas system 28, which provides at least one three-way catalyst 30. Generally the exhaust gas system 28 contains several catalysts, for example a pre-catalyst 30 that is built in close to the engine and a main catalyst 32 that is built in further away from the engine, which can be a three-way catalyst or a NOx-storage catalyst.

The combustion engine 10 features a turbo charger 34 with a turbine 36 and a compressor 38. The turbine 36 is arranged between a manifold 40 and the pre-catalyst 30 in the streaming direction of the exhaust gases. The pressure drop over the turbine 36 can be limited by a waste gate valve 42. But the invention is also usable if associated with turbo chargers without waste gate valves, for example if associated with turbo chargers with variable turbine geometry. A secondary air introduction into the exhaust gas system 28 takes place as the subject of FIG. 1 by an overflow of air from the suction system 22 over at least one inlet valve 18 and one outlet valve 20 of the a combustion chamber 12 that are opened together at the load alternation-ot. This overflow results from a sufficient big valve overlap and/or a sufficient big valve overlap profile and simultaneously a sufficient high pressure drop from the suction system 22 (before the inlet valves 18) to the exhaust gas system 20 before the catalyst 30. The combustion engine 10 is controlled by a control unit 48, which therefore processes signals of different sensors, which illustrate operating parameters of the combustion engine 10. These are in the incomplete illustration of FIG. 1 a rotation angle sensor 50, which determines an angle position ° KW of a crankshaft of the combustion engine 10 and therefore a position of the piston 14, an air mass sensor 52, which determines an air mass mL that flows into the combustion engine 10, a pressure sensor 54, which determines the pressure p in the suction stroke 22 before the inlet valve 18, and, optional, one or several exhaust gas sensors 56, 58, which determine a concentration of an exhaust gas component and/or a temperature of the exhaust gas.

In the embodiment of FIG. 1 the exhaust gas sensor 56 is a lambda sensor, which determines an oxygen concentration in the exhaust gas as a measure of an air ratio L (L=lambda), while the sensor 58 determines an exhaust gas temperature T at the inlet of the pre-catalyst 30. The air ratio lambda is known to be defined as the quotient of an actually available air mass in the numerator and an air mass that is required for a stoichiometric combustion of a certain fuel mass in the denominator. Air ratios lambda higher 1 represent therefore an air surplus, while air ratios lambda smaller 1 represent a fuel surplus. As long as the exhaust gas system 28 provides an exhaust gas temperature sensor 58, it can be also arranged in a different position of the exhaust gas system 28, for example at the inlet of the main catalyst 32. This especially applies when the main catalyst 32 is a NOx-storage catalyst.

The control unit 48 creates corrective signals from the signals of this and if necessary further sensors in order to control actuators for controlling the combustion engine 10. In the embodiment of FIG. 1 these are especially a corrective signal S_L for controlling a throttle valve position sensor 60, which adjusts the angle position of a throttle valve 62 in the suction system 22, a signal S_K, with which the control unit 48 controls the injector 24, a corrective signal S_Z, with which the control unit 48 controls the ignition plug 16 or the ignition system 16, which also provides inductors and/or condensers for producing the ignition voltage, and a corrective signal S_EV with which the control unit 48 controls the inlet profile and/or the inlet angle range of the inlet valve 18, and/or a corrective signal S_AV with which the control unit 48 controls the inlet profile and/or the inlet angle range of the outlet valve 20. When a waste-gate-valve 42 is provided, it is also controlled by the control unit 48. For this purpose, the control unit 48 outputs a signal S_WG.

Analogously to the illustration of the sensors it also applies to the depicted actuators, that the illustration of FIG. 1 is not complete and that modern combustion engines 10 can provide further actuators as exhaust gas recirculation valves, tank ventilation valves, actuators for variable controls of the gas exchange valves 18, 20 etc.

Besides the control unit 48 is customized especially programmed to implement the suggested procedure and/or one of its embodiments and/or to control a corresponding course of procedure.

In a preferred embodiment the control unit 48 converts performance requirements of the combustion engine 10 into a nominal value for the torque that has to be produced altogether by the combustion engine 10, and apportions these torques into torque rates, which are influenced by the corrective signals S_L for the filling control, S_K for the fuel metering, S_Z for the ignition control and S_WG for the boost pressure control. The filling rate is adjusted with the corrective signal S_L by a corresponding setting of the throttle valve 62 or a variable controlling of inlet valves 18. The fuel rate is adjusted with the corrective signal S_K basically by the injected fuel mass and the way of the apportionment of the fuel mass that has to be injected into one or several partial injections as well as the relative status of the partial injections to each other and to the movement of the piston 14, thus by an injection timing. The maximal torque that is possible at the present air filling results from optimal air ratio lambda, optimal injection timing and optimal ignition angle.

Figure 2:
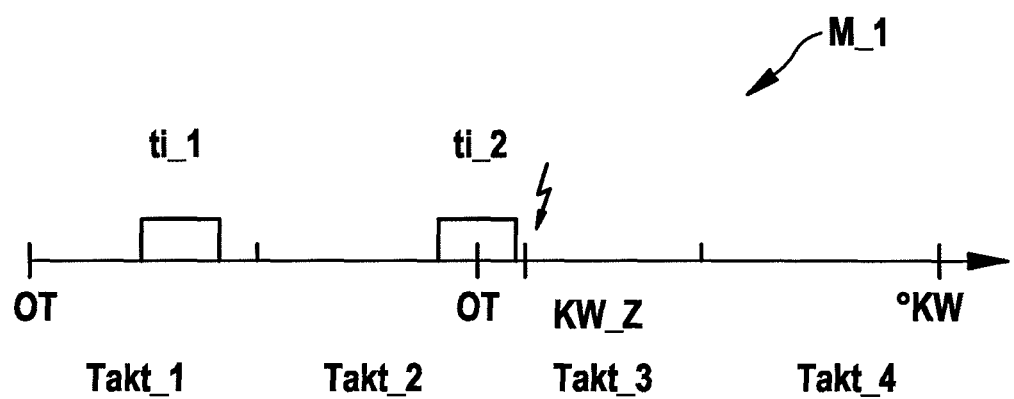
FIG. 2 is an injection model, which is used at an embodiment of the procedure according to the invention.

FIG. 2 shows an injection model, which is used at the embodiment of the procedure according to the invention. Thereby the injector pulse widths ti_1 and ti_2 are each put in as high level over the crankshaft angle ° KW of a working cycle from a suction stroke stroke_1, a compressor stroke stroke_2, a working stroke stroke_3 and an outlet stroke stroke_4. Upper top dead centers are labeled as OT.

In particular FIG. 2 shows an injection model M_1 for a homogeneous split operation for maximized exhaust enthalpy with a first partial injection ti_1, which takes place in the suction stroke stroke_1 and a second partial injection ti_2, which takes place later. The second partial injection ti_2 takes definitely place before the ignition, which is caused at the crankshaft angle KW_Z. As already mentioned KW_Z is possibly very late in the range of 10° to 35° KW after the ignition-ot, so that the second partial injection ti_2 can also be completely or partially in the working stroke stroke_3. But it is definitely before the ignition.

Instead of an apportionment into two partial injections the fuel amount that is injected with the first injection model M_1 can also be apportioned into more than two partial injections. The possibility of apportioning is limited by the dosing ability of small quantities of the injector 24. The apportionment into at least two partial injections, of which the earlier preferably takes place in the suction stroke stroke_1 and the latter definitely in the same working stroke for the ignition, is significant for the model M_1, whereby the air ratio lambda in the combustion chamber (thus without secondary air) is smaller than 1 and an air ratio lambda in the exhaust gas (thus with secondary air) is higher than 1.

Figure 3:
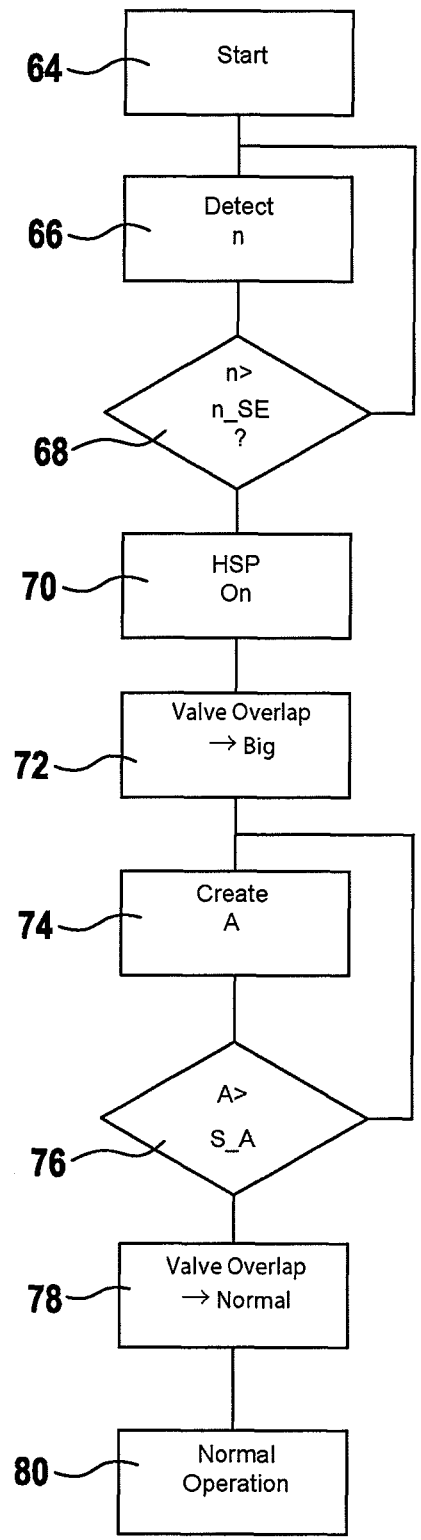
FIG. 3 is a flow diagram for illustrating procedure aspects of the invention.

FIG. 3 shows a flow diagram of procedure aspects of the invention. After a start-up of the combustion engine 10 in step 64 initially its engine speed n is determined in step 66 and compared to a threshold value n_SE in step 68. An exceeding of the threshold value n_SE branches the procedure to step 70, in which the described homogeneous split mode HSP with retarded ignition and increased filling is activated. In a preferred embodiment the combustion engine 10 is thereby operated almost completely de-throttled, whereby an almost complete de-throttling means an operation with at least 75% of the maximal filling that is possible under the same conditions.

Simultaneously or quickly afterwards in step 72 at a sufficient boost pressure the valve overlap or the valve overlap profile is adjusted from a value that is normal for the present operating conditions, thus especially for the idle mode, to an increased value, in order to enable an overflow of secondary air from the suction system 22 through the combustion chamber 12 into the exhaust gas system 28. The increase can for example take place with a stable time delay in the dimension of a few seconds towards the activating of the homogeneous split mode or depending on the exceeding of a boost pressure threshold.

Subsequently in step 74 a parameter A is established and determined, which shows the effect of the secondary air overflow. A time meter reading or a constant that characterizes the temperature of the turbo charger 34, the manifold 40 or of a catalyst 30, 32 are preferred as a parameter. Combinations of such constants are also possible. The parameter A is compared to a threshold value S_A as a termination criteria in step 76. When exceeding S_A the homogeneous split mode is terminated in step 78 and the valve overlap is reduced back to a value that is normal for the present operating conditions, which minimizes the overflow of secondary air through combustion chambers 12 or which causes, at a reduction of the boost pressure and a therefore resulting conversion of the direction of the scavenging loss, a recirculation of exhaust gas in the combustion chamber. The latter is also called an internal exhaust gas recirculation.

Step 80 branches into a normal operation of the combustion engine 10, in which no special measures for increasing the exhaust gas enthalpy are activated. The transfer can also take place step-by-step by reducing the valve overlap and/or the valve overlap profile first and then terminating the homogeneous split mode. The order can also be reversed.

Figure 4A:
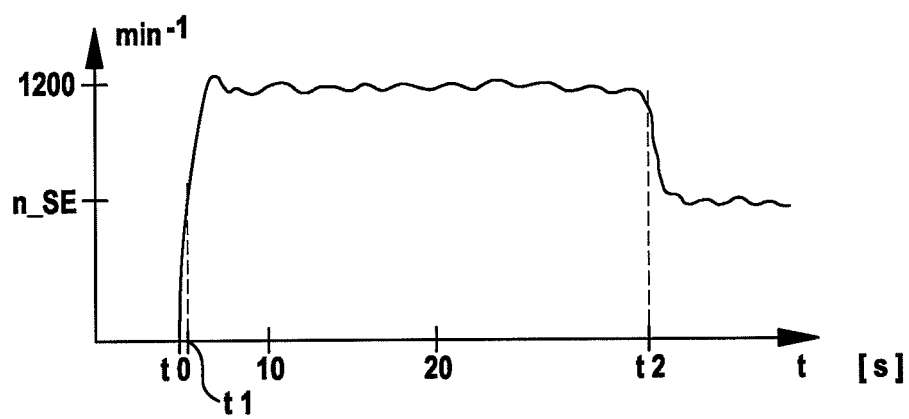
FIG. 4 shows temporal correlating courses of operating parameters of the combustion engine during the implementation of an embodiment of a procedure according to the invention.
Figure 4B:
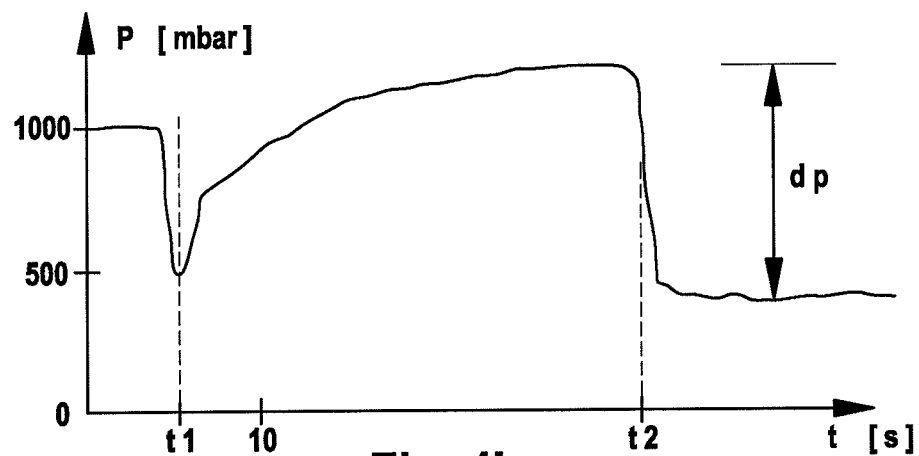
Figure 4C:
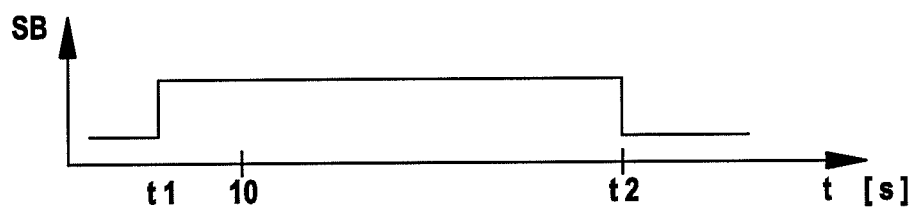

The effect of the procedure according to the invention is illustrated by the time course of the engine speed n, the boost pressure p and a control bit SB that are shown in FIG. 4. Before the point of time t=0 the combustion engine 10 stands still. Therefore its engine speed n that is shown in FIG. 4a initially equals zero and the boost pressure p that is shown in FIG. 4b corresponds with the surrounding pressure of about 1000 mbar. The value of the control bit SB that is shown in FIG. 4c is still low.

A starter accelerates the combustion engine at the point of time t0 onto a starter engine speed of a little over 200 min-1. With constituting combustions in the combustion chambers 12 the engine speed n of the combustion engine 10 increases more and exceeds a starting engine speed threshold of about 400 min-1 at the point of time t1. Subsequently it quickly levels out at an increased idle engine speed of about 1.200 min-1. Due to the suction of the first combustion chamber fillings from the suction system 22 at a turbine 36 that is still not rotating or still not rotating fast the boost pressure p before the inlet valves 18 sinks initially. When exceeding the starting engine speed threshold at the point of time t1 the after-starting phase begins. The control bit SB from FIG. 4c is set on its high level. The procedure according to the invention or one of its embodiments is implemented at a high level.

In order to provide a high enthalpy flow in the exhaust gas during this after-starting phase, the control unit 48 provides suboptimal ignition angles over the corrective variable S_Z, which cause a torque loss over the therefore reduced ignition angle efficiency, which is compensated by an increased filling of the combustion chambers 12 that is produced by corrective signals S_L. The turbine 36 of the exhaust gas turbo charger 34 is quickly accelerated by the enthalpy flow in the exhaust gas that is high due to the almost complete de-throttling, so that the boost pressure p increases quickly up to values of over 1200 mbar. During such boost pressures the pressure difference between the boost pressure on the fresh air side of the combustion chamber 12 and the exhaust gas side of the combustion chamber 12 is big enough in order to use controlled valve overlap and/or controlled valve overlap profile to let fresh air from the suction system 22 flow via the combustion chamber 12 into the exhaust gas system 28.

Therefore the control unit 48 controls the valve overlap and/or a valve overlap profile by releasing an opening corrective signal S_EV and/or S_AV. By an additional influence of the fuel corrective signals S_K an air ratio lambda is altogether adjusted in the exhaust gas in the stoichiometric operation (lambda equals 1) or in the over-stoichiometric operation, for example an air ratio lambda=1,1. Depending on the amount of the fresh air that has been injected into the exhaust gas, the air ratio lambda in the combustion chamber 12 is adjusted on to correspondingly lower values, which can also lie in the under-stoichiometric operation (lambda<1, fuel surplus).

Thereby a good ignition ability and a stabile combustion of the fuel/air mixture that is comprised in the combustion chambers are achieved. Simultaneously the over-stoichiometric air ratio in the exhaust gas is very important especially in the first phase after a start finish, because the still cold pre-catalyst 30 can not reduce hydrocarbons yet. Therefore the only possibility to limit the hydrocarbon emissions that are stored in the environment is to limit the raw emissions of the combustion engine 10. This limitation is a desired result of the operation with an air ratio lambda bigger than 1 in the exhaust gas.

A high exhaust gas amount is produced by the increased filling, which has furthermore a comparably high temperature due to the suboptimal ignition angle efficiency and which provides an oxygen surplus. Altogether a high heat flow or enthalpy flow is therefore produced. As soon as a termination criterion is fulfilled at the point of time t2, the increase of the exhaust gas enthalpy is terminated. The engine speed n of the combustion engine 10 falls then back on its normal idle engine speed, which lies typically between 500 and 100 min-1. The de-throttling that exceeds the necessary scope during normal operation is terminated. Thereby the pressure p between the throttle valve 62 that is than less opened and the inlet valves 18 drops a lot. In the drawing of FIG. 4 the pressure sinks up to about 400 mbar, whereby the actual value can vary form combustion engine to combustion engine and also depending on other conditions.

The low pressure is then not sufficient for a secondary air overflow, so that the valve overlap and/or the valve overlap profile are reduced on time. The pressure difference dp represents the extent of the pressure change, which is produced between the points of time t1 and t2 and which is used for a secondary air overflow. Without the idea for using the pressure change for a secondary air overflow the increased exhaust gas enthalpy, which results from the homogeneous split mode, would rather be terminated by opening the waste gate valve 42.

The invention claimed is:

1. A method of heating a catalyst in an exhaust gas system of a supercharged combustion engine having direct fuel injection and a variable gas exchange valve control, the method comprising:

produce a reactive exhaust gas fuel/air mixture in the exhaust gas system, wherein an air percentage of the reactive fuel/air mixture is produced by transferring air from a suction system of the combustion engine over a plurality of combustion chambers into the exhaust gas system;

operating the combustion engine in an idle mode almost completely de-throttled, whereby almost completely de-throttled means an operation with at least 75% of a maximal filling that is possible under the same conditions after a cold start with a greater valve overlap and/or a greater valve overlap profile in comparison to a normal operation;

determining an engine speed of the combustion engine initially after the cold start;

initiating catalyst heating directly after an exceeding of a start-end engine speed;

operating the combustion engine with a fuel amount to be injected before a combustion apportioned into at least two partial injections per ignition per combustion chamber, and with a suboptimal ignition angle efficiency, wherein the fuel is injected into each of the plurality of combustion chambers such that a rich fuel/air mixture develops in each of the plurality of combustion chambers;

operating the combustion engine after the cold start initially with an increased idle revolution; and injecting fuel into each of the plurality of combustion chambers such that an air rate lambda of the reactive exhaust gas fuel/air mixture in the exhaust gas system is greater than or equal to 1.

2. A non-transitory control unit configured to implement steps of a method of heating a catalyst in an exhaust gas system of a supercharged combustion engine having direct fuel injection and a variable gas exchange valve control, the control unit configured to:

after producing a reactive exhaust gas fuel/air mixture in the exhaust gas system, wherein an air percentage of the reactive fuel/air mixture is produced by transferring air from a suction system of the combustion engine over a plurality of combustion chambers into the exhaust gas system, operate the combustion engine in an idle mode almost completely de-throttled, whereby almost completely de-throttled means an operation with at least 75% of a maximal filling that is possible under the same conditions after a cold start with a greater valve overlap and/or a greater valve overlap profile in comparison to a normal operation wherein the catalyst is already heated;

determine an engine speed of the combustion engine initially after the cold start;

initiate catalyst heating directly after an exceeding of a start-end engine speed;

operate the combustion engine with a fuel amount to be injected before a combustion apportioned into at least two partial injections per ignition per combustion chamber, and with a suboptimal ignition angle efficiency, wherein the fuel is injected into each of the plurality of combustion chambers such that a rich fuel/air mixture develops in each of the plurality of combustion chambers;

operate the combustion engine after the cold start initially with an increased idle revolution; and inject the fuel into each of the plurality of combustion chambers such that an air rate lambda of the reactive exhaust gas fuel/air mixture in the exhaust gas system is greater than or equal to 1.

* * * * *